United States Patent
Willis et al.

(10) Patent No.: US 10,509,759 B2
(45) Date of Patent: Dec. 17, 2019

(54) MULTIPLE STORAGE DEVICES IMPLEMENTED USING A COMMON CONNECTOR

(71) Applicant: INTEL CORPORATION, Santa Clara, CA (US)

(72) Inventors: Daniel S. Willis, Portland, OR (US); Anthony M. Constantine, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/476,882

(22) Filed: Mar. 31, 2017

(65) Prior Publication Data

US 2018/0285307 A1 Oct. 4, 2018

(51) Int. Cl.
*G06F 13/42* (2006.01)
*G06F 9/54* (2006.01)
*G06F 13/38* (2006.01)

(52) U.S. Cl.
CPC .......... *G06F 13/4221* (2013.01); *G06F 9/544* (2013.01); *G06F 13/385* (2013.01); *G06F 13/4234* (2013.01); *G06F 13/4291* (2013.01); *G06F 2213/0026* (2013.01); *G06F 2213/0032* (2013.01)

(58) Field of Classification Search
CPC .......... G06F 13/00; G06F 13/12; G06F 15/167
See application file for complete search history.

(56) References Cited

U.S. PATENT DOCUMENTS 6,185,692 B1 * 2/2001 Wolford .............. G06F 13/4217
710/31
6,702,620 B2 3/2004 Lynch et al.
(Continued)

FOREIGN PATENT DOCUMENTS

EP 2559225 2/2013
WO 2016122461 8/2016

OTHER PUBLICATIONS

Extened European Search Report for EP Application No. 18154453.7, dated Jul. 12, 2018, 8 pp. [77.388EP (EPSR)].
(Continued)

*Primary Examiner* — Getente A Yimer
(74) *Attorney, Agent, or Firm* — Konrad Raynes Davda & Victor LLP; Alan S. Raynes (57) ABSTRACT

Provided are an apparatus, system, and method relating to detecting, during a system boot operation, whether a device arranged to implement a first bus interface protocol is coupled to a system through a connector. A bus clock is programmed to be off in response to detection of no device implementing the first bus interface protocol being coupled to the system through the connector. After the bus clock is programmed to be off, a buffer is reprogrammed to assume that the connector implements a second bus interface protocol coupled to a storage device. After reprogramming the buffer, the apparatus, system, and method detect whether a device arranged to implement the second bus interface protocol is coupled to the connector, and the device arranged to implement the second bus interface protocol is initialized in response to detection that the device is coupled to the connector. Other embodiments are described and claimed.

23 Claims, 4 Drawing Sheets

(56) References Cited

U.S. PATENT DOCUMENTS

| | | |
|---|---|---|
| 7,565,457 B2 | 7/2009 | Ooi et al. |
| 8,601,198 B2 | 12/2013 | Teh et al. |
| 8,706,944 B2 | 4/2014 | Song et al. |
| 8,745,296 B2 | 6/2014 | Guok et al. |
| 8,751,714 B2 | 6/2014 | Safranek et al. |
| 8,782,321 B2 | 7/2014 | Harriman et al. |
| 9,116,694 B2 | 8/2015 | Ooi |
| 9,280,504 B2 | 3/2016 | Ben-Michael et al. |
| 9,311,110 B2 | 4/2016 | Tamir et al. |
| 9,467,512 B2 * | 10/2016 | Tamir .................... G06F 15/167 |
| 9,552,316 B2 | 1/2017 | Desimone et al. |
| 9,710,421 B2 | 7/2017 | Tamarkin et al. |
| 2004/0148446 A1 * | 7/2004 | Katsch .................... G06F 3/038 |
| | | 710/104 |
| 2005/0138258 A1 * | 6/2005 | Seto ...................... G06F 13/409 |
| | | 710/301 |
| 2005/0182881 A1 | 8/2005 | Chou et al. |
| 2011/0320626 A1 * | 12/2011 | Wong ................ H04N 21/41407 |
| | | 709/231 |
| 2013/0282816 A1 * | 10/2013 | Fujita ..................... H04L 67/02 |
| | | 709/204 |
| 2016/0026596 A1 | 1/2016 | Klein |
| 2016/0147686 A1 * | 5/2016 | Poulsen .................... H04J 3/06 |
| | | 710/110 |
| 2016/0170914 A1 | 6/2016 | Pethe et al. |
| 2016/0170928 A1 | 6/2016 | Tamarkin et al. |
| 2016/0170929 A1 | 6/2016 | Pethe et al. |
| 2016/0259597 A1 | 9/2016 | Worley et al. |
| 2017/0102895 A1 * | 4/2017 | Kim ..................... G06F 3/0604 |

OTHER PUBLICATIONS

Examination Report for EP Application No. 18154453.7, dated Oct. 15, 2019, 5 pp.

* cited by examiner

MULTIPLE STORAGE DEVICES IMPLEMENTED USING A COMMON CONNECTOR

TECHNICAL FIELD

Embodiments described herein generally relate to computing devices, systems and methods including the use of storage implemented through a connector.

BACKGROUND

A computational device may be coupled to one or more physical storage devices in which data may be stored. The computational device may communicate with a physical storage device over a bus such as a PCIe (Peripheral Component Interconnect Express bus, (see http://www.pcsig.com)), and a variety of interfaces to different type of storage devices, such as SATA (Serial ATA) drives (see http://www.sata-ip.org) and NVMe (Non-Volatile Memory Express) drives (see http://www.nvmexpress.org). System designers have typically predetermined the allocation of storage and connections thereto at the time of board design.

BRIEF DESCRIPTION OF THE DRAWINGS

Embodiments are described by way of example, with reference to the accompanying drawings, which are not drawn to scale, in which like reference numerals may refer to similar elements.

DESCRIPTION OF EMBODIMENTS

In certain computer architectures, an input/output (IO) buffer may be used to allocate HSIO (high speed IO) for various usages such as, for example, USB (Universal Serial Bus), PCIe, and SATA. A variety of storage connection specifications for coupling a storage device to a motherboard may be utilized, including a mix of SATA connectors, M.2 connectors, and U.2 connectors. SATA 3.0 (Serial ATA Revision 3.0 Specification (released June 2009), operates at 6 Gb/s (Gigabits/second) or 600 MB/s (Megabytes/sec). NVMe over M.2 or U.2 (using PCIe 3.0 (PCI Express Base Specification Revision 3.0 (released Nov. 10, 2010))×4 link) operates at 32 Gb/s or 3938 MB/s. While past designs supported SATA connectors, as performance needs increase, a mix of more U.2 and/or M.2 connectors has arisen to enable the use of higher performance storage devices.

The U.2 connector, originally known as SFF-8639 (Enterprise SSD Form Factor Version 1.0 (released Dec. 20, 2011), comprises a connector that is mechanically identical to the SATA Express device plug, but provides four PCIe lanes through a different usage of available pins. The M.2 specification (e.g., PCI Express M.2 Specification Revision 1.0 (released Nov. 1, 2013)) for the M.2 connector provides up to four PCIe lanes and one logical SATA 3.0 (6 Gbit/s) port, and exposes the PCIe and SATA lanes through the same connector so both PCIe and SATA storage devices may exist in form of M.2 modules.

Certain embodiments related to devices, systems, and methods that detect a storage device during a system boot operation, including detecting whether a device implementing a first bus interface protocol is coupled to the system through a connector. In response to detecting that no device implementing the first bus interface protocol is coupled to the system through the connector, then a bus clock to the connector is programmed to be off. After the programming the bus clock to be off, a buffer is reprogrammed to assume that the connector implements a second bus interface protocol to connect a storage device. After the reprogramming the buffer, if it is determined that a storage device implementing the second bus interface protocol is coupled to the connector, then the storage device implementing the second bus interface protocol is initialized.

Certain embodiments further relate to determining whether the device implementing the first bus interface protocol is a storage device implementing a logical device interface protocol in response to detecting that the device implementing the first bus interface protocol is coupled to the system through the connector; and initializing the storage device in response to determining that the device implementing the first bus interface protocol also implements a logical device interface protocol.

In certain embodiments, the first bus interface protocol may comprise a PCIe bus interface protocol, and the second bus interface protocol may comprise a SATA bus interface protocol.

Figure 1:
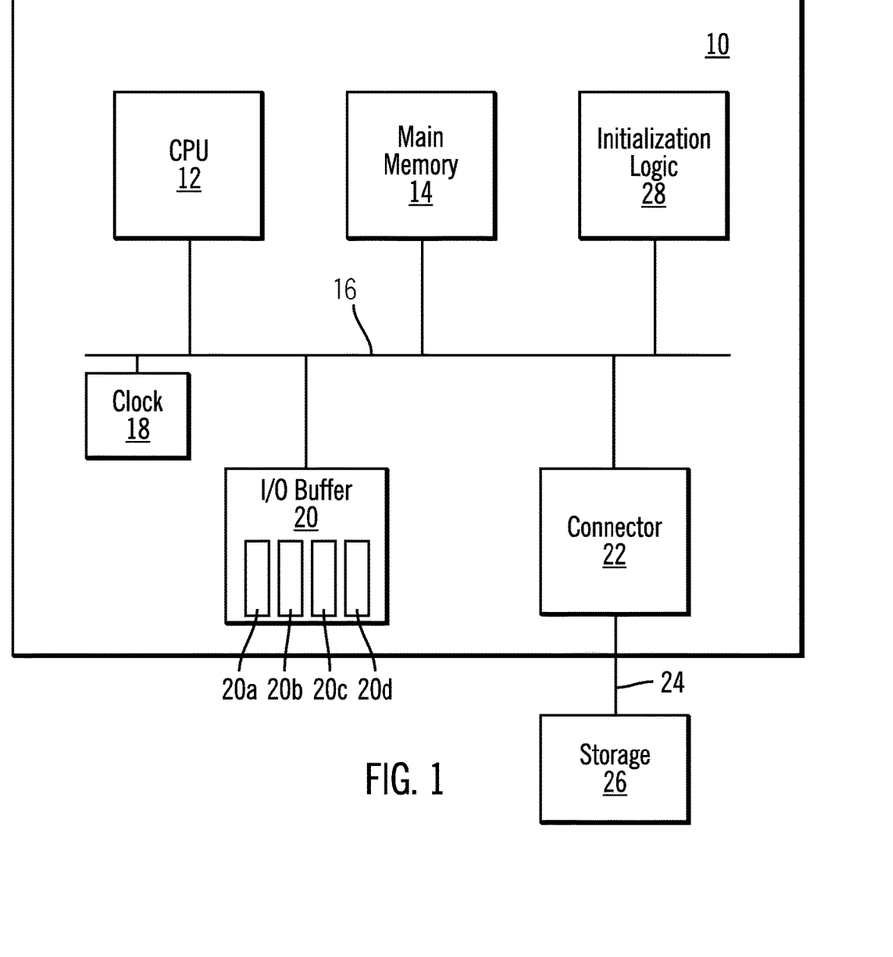
FIG. 1 illustrates an embodiment of a storage environment in accordance with certain embodiments.

FIG. 1 illustrates a system in accordance with certain embodiments, including a computational device 10 that communicates with a storage device 26 coupled to the system through a cable 24 coupled to a connector 22. The computational device 10 may include a central processing unit (CPU) 12 and main memory 14. Communication between the CPU 12 and the storage device 26 and the connector may be carried out over a bus interface 16 coupled to the connector 22. The I/O buffer 20 may be used to allocate buffers, such as HSIO buffers, for various bus protocols such as USB, PCIe, and SATA. The computational device 10 further includes initialization logic (including, for example, firmware such as a basic input output system (BIOS)) 28 that initializes the hardware and devices connected to the bus 16 and in the system 10. The initialization logic 28 may in certain embodiments be provided on an integrated circuit die, an application specific integrated circuit (ASIC), and/or a processor executing software stored in a non-volatile memory device. The initialization logic 28 may dynamically detect which type(s) of storage drive(s) are coupled to the cable 24 at the time of system boot.

Figure 2A:
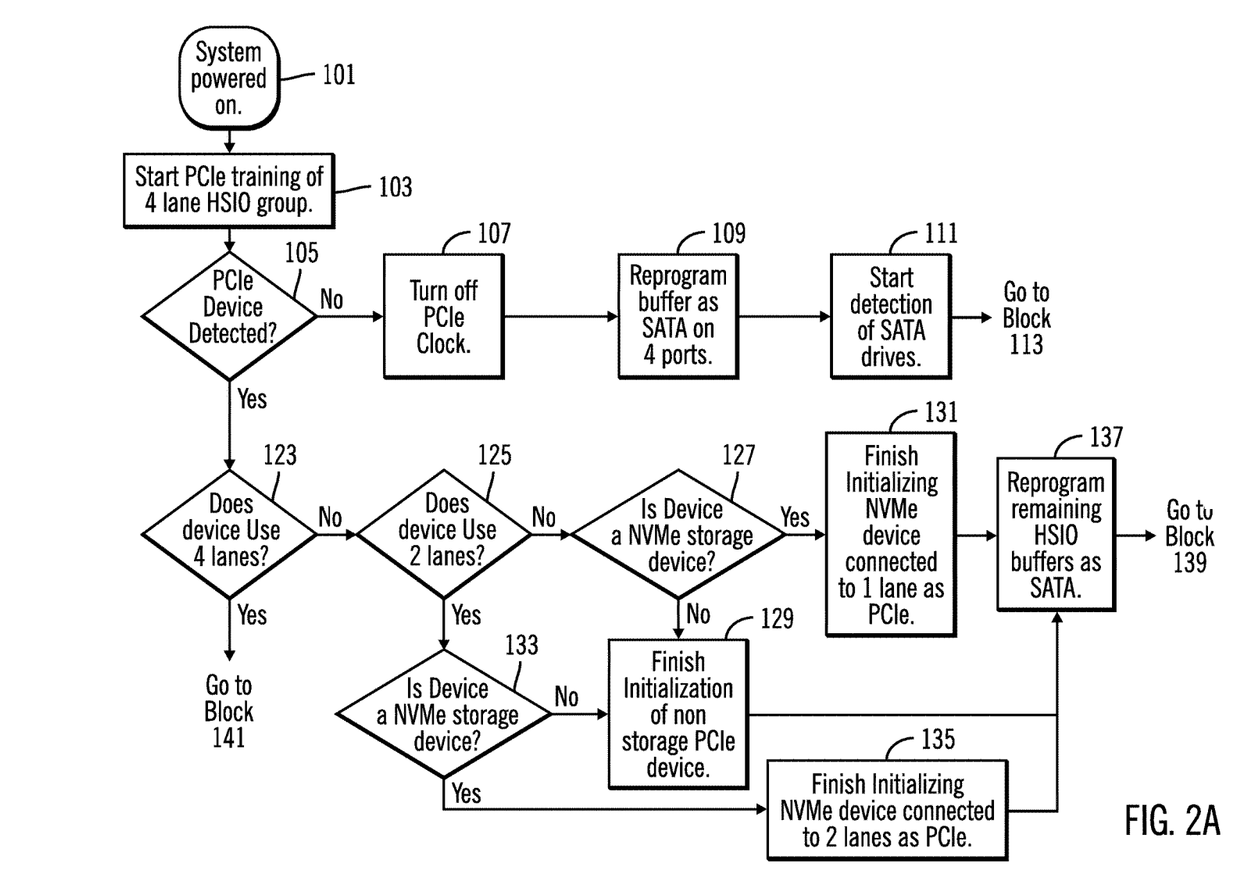
FIGS. 2a-2b illustrate a flowchart of operations for detecting storage drives, in accordance with certain embodiments.
Figure 2B:
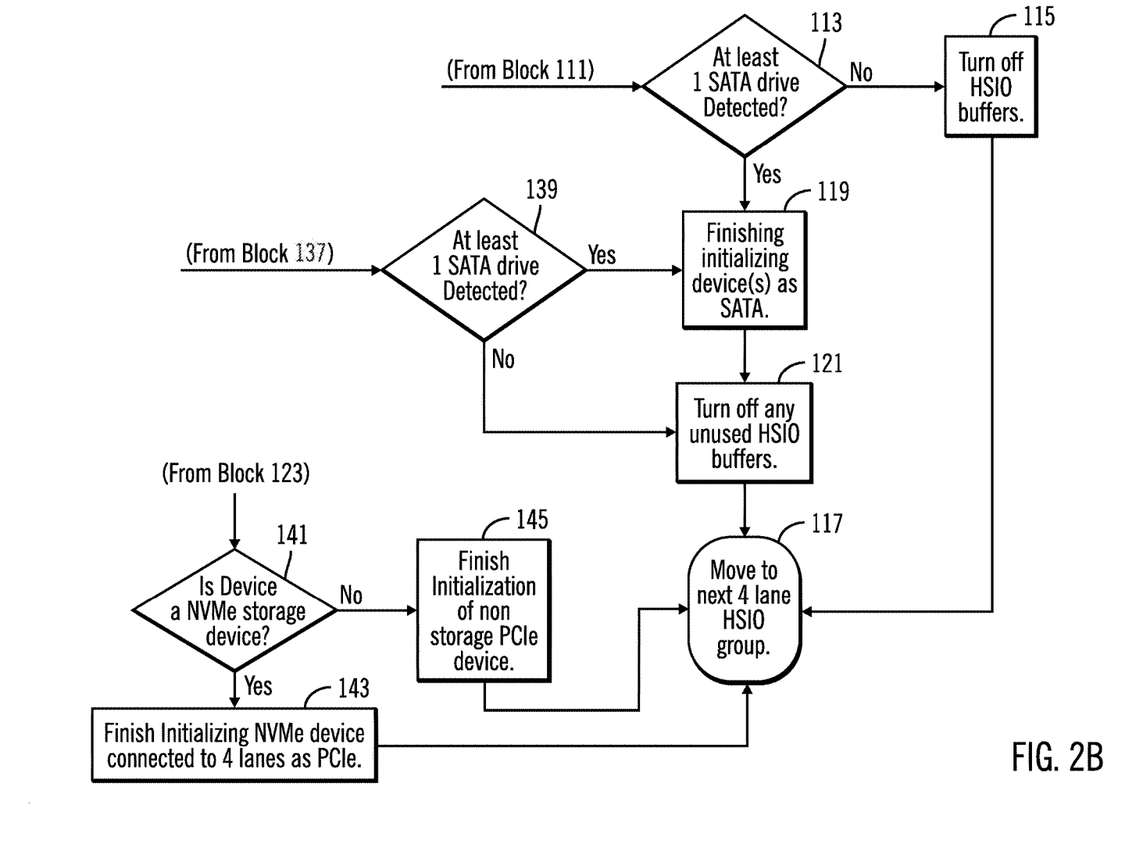

FIGS. 2a and 2b illustrate a flow chart of operations for detecting the type of storage device(s) attached to a system at the time of system boot. Upon the system 10 being powered-on (at block 101), the initialization logic 28 begins (at block 103) bus 16 initialization, which includes PCIe training of a first four lane HSIO group. A bus using the PCIe protocol may be a high speed I/O bus in which multiple lanes of the bus may combine their data transfer capability to send the read or write command from the host to the storage device. A bus using the SATA protocol may include use of a high-speed serial cable (e.g., cable 24) to send the read or write command from the host to the storage device. In certain embodiments that use interfaces in accordance with the SATA Revision 3.2 (Serial ATA Revision 3.2 Specification (released August 2013)), an interface capable of interfacing with buses using both SATA and PCIe protocols, may be arranged to route the read or write commands from a computational device to a storage device via the high speed serial cable. The initialization logic 28 determines (at block 105) whether a PCIe device is detected.

If (at block 105) no PCIe device is detected, then the initialization logic 28 turns off (at block 107) the PCIe clock 18 and reprograms (at block 109) the I/O buffer 20 as SATA on four ports (one for each of the lanes in the first four lanes 20a, 20b, 20c, 20d in an HSIO group). The initialization logic 28 detects (at block 111) whether any SATA drives 26 are present. If (at block 111) no SATA drives 26 are present, then the initialization logic 28 turns off (at block 115) the HSIO buffers 20 and then proceeds to configure (at block 117) the next four lane HSIO group for initialization. If at least one SATA drive is detected, then the initialization logic 28 finishes (at block 119) initializing the storage device(s) 26 as SATA. Once the device(s) 26 are initialized, the initialization logic 28 turns-off (at block 121) any unused HSIO buffers. Then, the initialization logic 28 proceeds (at block 117) to processing (at block 103) the next four lane HSIO group for training and initialization.

If (at block 105) a PCIe device is detected, then the initialization logic 28 determines (at block 123) whether the detected PCIe device uses four lanes. It is possible in certain configurations that a non-storage PCIe device may be detected As a result, if a PCIe device is detected, the initialization logic 28 determines (at block 141) whether the detected PCIe device is an NVMe storage device. If not, then the initialization logic 28 completes (at block 145) initialization of the non-storage PCIe device, and proceeds (at block 117) to the next four lane HSIO group for training and initialization block 103. If (at block 141) there is a NVMe storage device detected as storage device 26, then the initialization logic 28 finishes (at block 145) initializing the detected NVMe storage device 26 connected to four lanes of the cable 24 as a PCIe device.

If a PCIe device is detected that does not use four lanes of the cable 24, then the initialization logic 28 determines (at block 125) whether the device uses two lanes of the cable 24. If the device does not use two lanes, then the initialization logic 28 determines (at block 127) whether the device is a NVMe storage device. If the device is not an NVMe storage device, then the initialization logic 28 completes (at block 129) initialization of the non-storage PCIe device. Then the initialization logic 28 (at block 137) reprograms any remaining HSIO buffers as SATA. If the device does not use two lanes, and is a NVMe storage device, then the initialization logic 28 (at block 131) completes initializing the NVMe storage device connected to one lane of the cable 24 as a PCIe device. Then, the initialization logic 28 (at block 137) reprograms any remaining HSIO buffers as SATA.

If the PCIe device uses two lanes of the cable 24, then the initialization logic 28 (at block 133) determines whether the device is an NVMe storage device. If the device is not an NVMe storage device, then the initialization logic 28 (at block 129) completes initialization of the non-storage PCIe device. Then the initialization logic 28 (at block 137) reprograms any remaining HSIO buffers as SATA. If the device uses two lanes and is a NVMe storage device, then the initialization logic 28 (at block 135) completes initializing the NVMe storage device connected to two lanes of the cable 24 as a PCIe device. Then, the initialization logic 28 (at block 137) reprograms any remaining HSIO buffers as SATA.

After the initialization logic 28 (at block 137) reprograms the remaining HSIO buffers as SATA, the initialization logic 28 (at block 139) determines whether at least one SATA drive is detected. If yes, then the initialization logic 28 (at block 119) completes initializing the device(s) as SATA. Once the device(s) are initialized, the initialization logic 28 (at block 121) turns off any unused HSIO buffers. Then, the initialization logic 28 (at block 117) moves on to the next four lane HSIO group for training and initialization (at block 103).

If the PCIe device uses four lanes of the cable 24, then the initialization logic 28 (at block 141) determines whether the device is an NVMe storage device. If the device using four lanes is an NVMe storage device, then the initialization logic 28 (at block 145) completes initializing the NVMe device connected to four lanes of the cable 24 as a PCIe device. Then, the initialization logic 28 (at block 117) moves on to the next four lane HSIO group for training and initialization (at block 103). If the device using four lanes is not an NVMe storage device, then the initialization logic 28 (at block 143) completes initializing the NVMe device connected to four lanes of the cable 24 as a PCIe device. Then, the initialization logic 28 (at block 117) moves on to the next four lane HSIO group for training and initialization (at block 103).

Certain embodiments enable one to resolve storage connector limitations by dynamically detecting and configuring a plurality of computer storage architectures. This enables the system to determine which type of storage device is coupled to the system through a connector and cable during the system boot operation.

One embodiment enables the use of SATA and/or NVMe drives coupled to a system through either U.2 or M.2 connectors and cables. In one such embodiment, the initialization logic tests for the presence of PCIe drives and if PCIe drives are detected, then the boot continues with the PCIe drive (NVMe drive) operational. If no PCIe drives are detected, then the PCIe clock for either a U.2 or M.2 connector is turned off, and the IO buffer is reprogrammed to assume SATA protocols are used on all the HSIO lanes in the group of HSIO lanes being tested. Then any SATA drives (assuming a U.2 or M.2 connector and a U.2 or M.2 cable having a SATA connector at the drive end) are detected and if present, boot operations continue with the SATA drives initialized and made operational. If no PCIe drives and no SATA drives are detected, then the boot operation continues with no drives in the selected HSIO lanes.

Certain embodiments also relate to a cable that may be used to couple SATA drives to a system having a U.2 or M.2 connector thereon. Whereas conventional systems may utilize, for example, four SATA connectors to couple four SATA drives thereto, certain embodiments may utilize, for example, a single U.2 or M.2 connector to couple one, two, three, or four SATA drives to the system. Alternatively, the same U.2 or M.2 connector may be used to couple a NVMe drive to the system through a U.2 or M.2 cable having an NVMe connector at the drive end. Such embodiments permit a system integrator and/or end user to be able to dynamically choose which type of cable and hard drives to populate in a system, whereas other systems require predetermined cable and hard drive selection. Certain embodiments relating to systems utilizing SATA drives and NVMe drives are illustrated in FIGS. 3-5.

Figure 3:
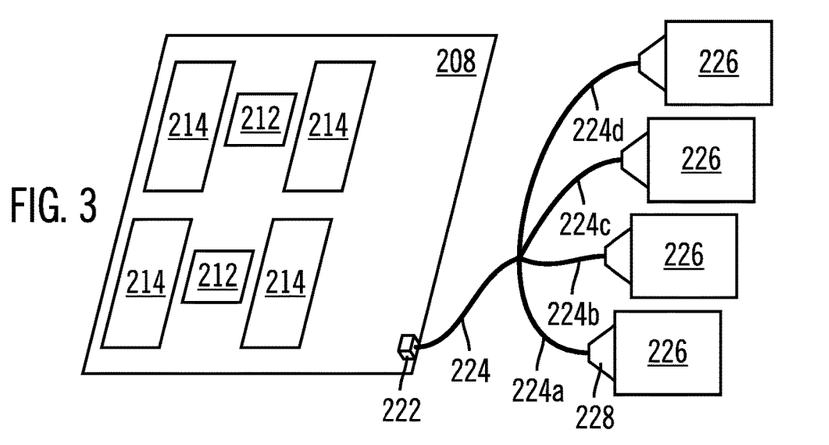
FIG. 3 illustrates a system including multiple storage drives coupled to a connector, in accordance with certain embodiments.

FIG. 3 illustrates a system including a circuit board 208 such as a motherboard, on which one or more processors 212 and one or more memory regions 214 may be positioned. The board 208 also includes a board connector 222 for coupling one or more drives thereto. The board 208 may also include other features (not shown), such as board management hardware and routing, and other external input/output connections such as, for example, Ethernet connections, USB connections, and video connections. The connector 222 may, in certain embodiments, be selected from a U.2 connector and an M.2 connector. The connector 222 may utilize four lanes for data transfer.

A cable 224 is coupled to the connector 222. The cable 224 includes a first end attached to the connector and a second end that includes four fingers 224a, 224b, 224c, and 224d each extending to a SATA drive connector 228 for attaching to a SATA drive 226. The first end of the cable 224 may be configured to mate with a U.2 connector or an M.2 connector, while the second end is configured to mate with one or more SATA drives. The SATA drives may utilize one HSIO lane for input/output, and the U.2 or M.2 connector may utilize four HSIO lanes. As a result, the cable 224 may include up to four SATA drives 226 coupled thereto.

Figure 4:
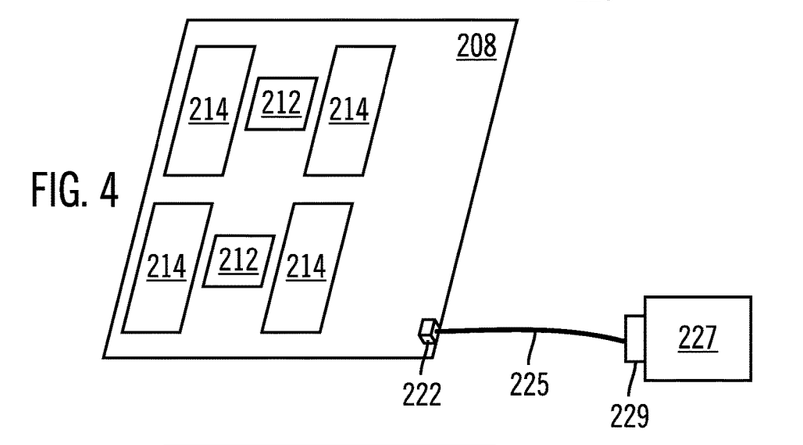
FIG. 4 illustrates a system including a storage drive coupled to a connector, in accordance with certain embodiments.
Figure 5:
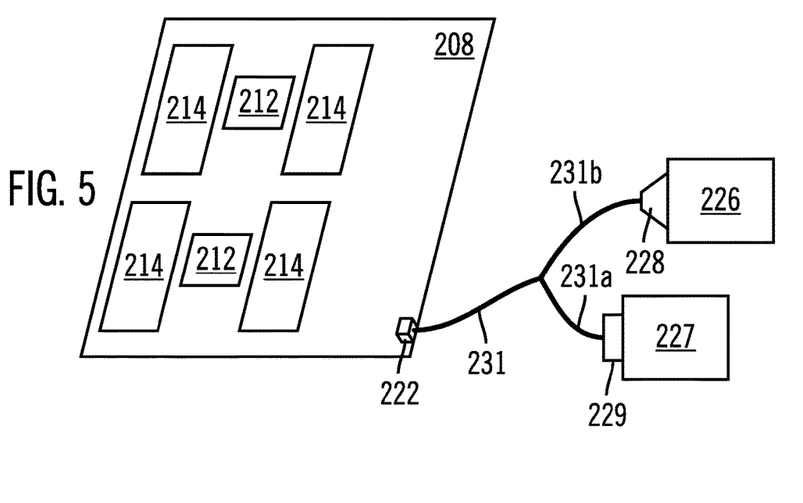
FIG. 5 illustrates a system including two types of storage drives coupled to a connector, in accordance with certain embodiments.

FIG. 4 illustrates a system including the same circuit board 208 as in FIG. 3, with the same components thereon including the same board connector 222. When the connector is a U.2 or an M.2 connector, a single NVMe drive 227 may be coupled to the connector 222 through the cable 225, which includes a first end configured to mate with the U.2 or M.2 connector 222, and the other extending to an NVMe drive connector 229 (e.g., SFF-8639 connector) configured to mate with the NVMe drive 227. The NVMe drive 227 may utilize four HSIO lanes for input/output, and as a result, a single NVMe 227 drive is connected to the cable 225.

Alternative embodiments may include the use of multiple drive types coupled to the same connector. For example, FIG. 5 illustrates a system including the same circuit board 208 as in FIGS. 3-4, with the same components thereon including the same board connector 222. The first end of the cable 231 may be configured to mate with a U.2 connector or an M.2 connector, while the second end is configured to mate with a SATA drive 226 and a NVMe drive 227. The cable 231 includes a second end having two fingers 231a and 231b, with finger 231a including a NVMe drive connector 229 to couple to the NVME drive 227, and finger 231b including a SATA drive connector 228 to couple to the SATA drive 226. While the NVMe drive 227 is capable of utilizing four HSIO lanes, it will operate when utilizing less than four lanes. It may not have the same performance as when four HSIO lanes are used, but there may be other considerations that would motivate one to utilize one or more SATA drives together with a NVMe drive. While the embodiment illustrated in FIG. 5 shows one SATA drive 226 and one NVMe drive 227, embodiment may include additional fingers and drives.

The initialization logic 28 operations described with respect to FIGS. 2a and 2b may be used to detect and configure the attachment of devices as shown with respect to FIGS. 3, 4, and 5.

In certain embodiments, the systems described above may comprise a personal computer, server, mobile device or embedded computer device. In a silicon-on-chip (SOC) implementation, at least some of the architecture may be implemented in an integrated circuit die.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following examples pertain to further embodiments. Specifics in the Examples may be used anywhere in one or more embodiments.

Example 1 is a method for detecting a device during a system boot operation, comprising: detecting, during a system boot operation, whether a device implementing a first bus interface protocol is coupled to a system through a connector; programming a bus clock to the connector to be off in response to detecting that no device implementing the first bus interface protocol is coupled to the system through the connector; after programming the bus clock to be off, reprogramming a buffer to assume that the connector implements a second bus interface protocol to couple a storage device; after reprogramming the buffer, detecting whether a storage device implementing the second bus interface protocol is coupled to the connector; and initializing the storage device implementing the second bus interface protocol in response to detecting that the storage device implementing the second bus interface protocol is coupled to the connector.

In Example 2, the subject matter of any one of Examples 1 and 3-10 can optionally include wherein the first bus interface protocol comprises a Peripheral Component Interconnect Express (PCIe) bus interface protocol, and the second bus interface protocol comprises a Serial Advanced Technology Attachment (SATA) bus interface protocol.

In Example 3, the subject matter of any one of Examples 1-2 and 4-10 can optionally include detecting whether a device implementing a first bus interface protocol is coupled to the system through a connector comprises evaluating a four lane high speed input output (HSIO) group.

In Example 4, the subject matter of any one of Examples 1-3 and 5-10 can optionally include wherein reprogramming the buffer includes reprogramming the buffer on four ports.

In Example 5, the subject matter of any one of Examples 1-4 and 6-10 can optionally include turning off any unused buffer after initializing the storage device.

In Example 6, the subject matter of any one of Examples 1-5 and 7-10 can optionally include determining whether the device implementing the first bus interface protocol is a storage device implementing a logical device interface protocol in response to detecting that the device implementing the first bus interface protocol is coupled to the system through the connector; and initializing the storage device in response to determining that the device implementing the first bus interface protocol also implements a logical device interface protocol.

In Example 7, the subject matter of any one of Examples 1-6 and 8-10 can optionally include that the first bus interface protocol comprises a Peripheral Component Interconnect Express (PCIe) bus interface protocol, wherein the second bus interface protocol comprises a Serial Advanced Technology Attachment (SATA) bus interface protocol, and wherein the logical device interface protocol comprises a Non-Volatile Memory Express (NVMe) logical device bus interface protocol.

In Example 8, the subject matter of any one of Examples 1-7 and 9-10 can optionally include wherein the detecting whether a device implementing a first bus interface protocol is coupled to the system through a connector comprises evaluating a four lane high speed input output (HSIO) group.

In Example 9, the subject matter of any one of Examples 1-8 and 10 can optionally include that after initializing the storage device in response to determining that the device implementing the first bus interface protocol also implements a logical device interface protocol, reprogramming any unused HSIO buffers to assume that the connector implements the second bus interface protocol.

In Example 10, the subject matter of any one of Examples 1-9 can optionally include wherein the initializing the storage device implementing the second bus interface protocol comprises initializing a plurality of SATA drives.

Example 11 is an apparatus to detect a device during a system boot operation comprising: initialization logic in communication with a bus, a bus clock, a buffer, a connector, and a storage device, at least a portion of the initialization logic in hardware, the initialization logic to: detect whether a device arranged to implement a first bus interface protocol is coupled to the bus through the connector; program a bus clock to the connector to be off in response to detection of no device arranged to implement the first bus interface protocol is coupled through the connector; after the bus clock is programmed to be off, reprogram a buffer to assume that the connector implements a second bus interface protocol to the bus to couple a storage device; after the buffer is reprogrammed, detect whether a storage device arranged to implement the second bus interface protocol is coupled to the connector; and initialize the storage device arranged to implement the second bus interface protocol in response to detection that the storage device arranged to implement the second bus interface protocol is coupled to the connector.

In Example 12, the subject matter of any one of Examples 11 and 13-20 can optionally include wherein the first bus interface protocol comprises a Peripheral Component Interconnect Express (PCIe) bus interface protocol, and the second bus interface protocol comprises a Serial Advanced Technology Attachment (SATA) bus interface protocol.

In Example 13, the subject matter of any one of Examples 11-12 and 14-20 can optionally include wherein the initialization logic is configured to detect whether the device arranged to implement a first bus interface protocol is coupled to the bus through the connector comprises an evaluation of a four lane high speed input output (HSIO) group.

In Example 14, the subject matter of any one of Examples 11-13 and 15-20 can optionally include wherein the reprogram the buffer includes a reprogram of the buffer on four ports.

In Example 15, the subject matter of any one of Examples 11-14 and 16-20 can optionally include wherein the initialization logic turns off any unused buffer after the storage device is initialized.

In Example 16, the subject matter of any one of Examples 11-15 and 17-20 can optionally include configuring the initialization logic to: determine whether the device arranged to implement the first bus interface protocol is a storage device arranged to implement a logical device interface protocol in response to detection of the device arranged to implement the first bus interface protocol is coupled to the bus through the connector; and initialize the storage device in response to the determination that the device arranged to implement the first bus interface protocol also is arranged to implement a logical device interface protocol.

In Example 17, the subject matter of any one of Examples 11-16 and 18-20 can optionally include wherein the first bus interface protocol comprises a Peripheral Component Interconnect Express (PCIe) bus interface protocol, wherein the second bus interface protocol comprises a Serial Advanced Technology Attachment (SATA) bus interface protocol, and wherein the logical device interface protocol comprises a Non-Volatile Memory Express (NVMe) logical device bus interface protocol.

In Example 18, the subject matter of any one of Examples 11-17 and 19-20 can optionally include wherein the initialization logic is to detect whether a device arranged to implement a first bus interface protocol is coupled through a connector by evaluation of a four lane high speed input output (HSIO) group.

In Example 19, the subject matter of any one of Examples 11-18 and 20 can optionally include wherein the initialization logic, after the initialization of the storage device in response to the determination that the storage device arranged to implement the first bus interface protocol also implements a logical device interface protocol, reprograms any unused HSIO buffers to cause the connector to implement the second bus interface protocol.

In Example 20, the subject matter of any one of Examples 11-19 can optionally include wherein the initialization of the storage device arranged to implement the second bus interface protocol comprises initializing a plurality of SATA drives.

Example 21 is a system to detect a storage device during a system boot operation comprising: a bus; a bus clock in communication with the bus; a buffer in communication with the bus; a storage device for storing data; a connector configured to couple the storage device to the bus; initialization logic to: detect whether a device arranged to implement a first bus interface protocol is coupled to the bus through the connector; program a bus clock to the connector to be off in response to detection of no device arranged to implement the first bus interface protocol is coupled to the system through the connector; after the bus clock is programmed to be off, reprogram a buffer to assume that the connector implements a second bus interface protocol to the bus to couple a storage device; after the buffer is reprogrammed, detect whether a storage device implementing the second bus interface protocol is coupled to the connector; and initialize the storage device arranged to implement the second bus interface protocol in response to detection that the storage device arranged to implement the second bus interface protocol is coupled to the connector.

In Example 22, the subject matter of any one of Examples 21 and 23-30 can optionally include wherein the first bus interface protocol comprises a Peripheral Component Interconnect Express (PCIe) bus interface protocol, and the second bus interface protocol comprises a Serial Advanced Technology Attachment (SATA) bus interface protocol.

In Example 23, the subject matter of any one of Examples 21-22 and 24-30 can optionally include wherein the initialization logic is configured to detect whether the device arranged to implement a first bus interface protocol is coupled to the bus through the connector comprises an evaluation of a four lane high speed input output (HSIO) group.

In Example 24, the subject matter of any one of Examples 21-23 and 25-30 can optionally include wherein the reprogram the buffer includes a reprogram of the buffer on four ports.

In Example 25, the subject matter of any one of Examples 21-24 and 26-30 can optionally include wherein the initialization logic turns off any unused buffer after the storage device is initialized.

In Example 26, the subject matter of any one of Examples 21-25 and 27-30 can optionally include further comprising the initialization logic to: determine whether the device arranged to implement the first bus interface protocol is a device arranged to implement a logical device interface protocol in response to detection of the storage device implementing the first bus interface protocol is coupled to the bus through the connector; and initialize the storage device in response to the determination that the device arranged to implement the first bus interface protocol also is arranged to implement a logical device interface protocol.

In Example 27, the subject matter of any one of Examples 21-26 and 28-30 can optionally include wherein the first bus interface protocol comprises a Peripheral Component Interconnect Express (PCIe) bus interface protocol, wherein the second bus interface protocol comprises a Serial Advanced Technology Attachment (SATA) bus interface protocol, and wherein the logical device interface protocol comprises a Non-Volatile Memory Express (NVMe) logical device interface protocol.

In Example 28, the subject matter of any one of Examples 21-27 and 29-30 can optionally include wherein the initialization logic is configured to detect whether a storage device arranged to implement a first bus interface protocol is coupled to the system through a connector by evaluation of a four lane high speed input output (HSIO) group.

In Example 29, the subject matter of any one of Examples 21-28 and 30 can optionally include wherein the initialization logic, after the initialization of the storage device in response to the determination that the storage device arranged to implement the first bus interface protocol also implements a logical device interface protocol, reprograms any unused HSIO buffers to cause the connector to implement the second bus interface protocol.

In Example 30, the subject matter of any one of Examples 21-29 can optionally include wherein the initialization of the storage device arranged to implement the second bus interface protocol comprises initializing a plurality of SATA drives.

Example 31 is an apparatus including a cable to couple a storage device to a board, the cable to include: a first end configured to mate with a board connector that is compatible with a first bus interface protocol and a second bus interface protocol; and a second end including first, second, third, and fourth connectors compatible with the second bus interface protocol and configured to mate with a storage device arranged to implement the second bus interface protocol.

In Example 32, the subject matter of any one of Examples 31 and 33 can optionally include wherein the first bus interface protocol comprises a Peripheral Component Interconnect Express (PCIe) bus interface protocol, and wherein the second bus interface protocol comprises a Serial Advanced Technology Attachment (SATA) bus interface protocol.

In Example 33, the subject matter of any one of Examples 31-32 can optionally include wherein the second end includes first, second, third, and fourth fingers, the first connector coupled to the first finger, the second connector coupled to the second finger, the third connector coupled to the third finger, and the fourth connector coupled to the fourth finger.

Example 34 is an apparatus including a cable to couple a storage device to a board, the cable to include: a first end configured to mate with a board connector that is compatible with a first bus interface protocol and a second bus interface protocol; and a second end including at least one connector compatible with the second bus interface protocol and configured to mate with a storage device arranged to implement the second bus interface protocol.

In Example 35, the subject matter of any one of Examples 34 and 36-41 can optionally include wherein the first bus interface protocol comprises a Peripheral Component Interconnect Express (PCIe) bus interface protocol, and wherein the second bus interface protocol comprises a Serial Advanced Technology Attachment (SATA) bus interface protocol.

In Example 36, the subject matter of any one of Examples 34-35 and 37-41 can optionally include wherein the at least one connector compatible with the second bus interface protocol and configured to mate with a storage device arranged to implement the second bus interface protocol includes one connector.

In Example 37, the subject matter of any one of Examples 34-36 and 38-41 can optionally include wherein the at least one connector compatible with the second bus interface protocol and configured to mate with a storage device arranged to implement the second bus interface protocol includes two connectors.

In Example 38, the subject matter of any one of Examples 34-37 and 39-41 can optionally include wherein the at least one connector compatible with the second bus interface protocol and configured to mate with a storage device arranged to implement the second bus interface protocol includes three connectors.

In Example 39, the subject matter of any one of Examples 34-38 and 40-41 can optionally include wherein the at least one connector compatible with the second bus interface protocol and configured to mate with a storage device arranged to implement the second bus interface protocol includes four connectors.

In Example 40, the subject matter of any one of Examples 34-39 and 41 can optionally further comprise the motherboard and the connector.

In Example 41, the subject matter of any one of Examples 34-40 can optionally further comprise the storage device, wherein the storage device includes at least one storage device selected from the group consisting of Serial Advanced Technology Attachment (SATA) drives and Non-Volatile Memory Express NVMe drives.

Example 42 is an apparatus including a cable to couple a storage device to a board, the cable to include: a first end configured to mate with a board connector that is compatible with a first bus interface protocol and a second bus interface protocol; and a second end including at least one connector compatible with the second bus interface protocol and configured to mate with a storage device arranged to implement the second bus interface protocol; the second end also including at least one connector compatible with the first bus interface protocol and configured to mate with a storage device arranged to implement the first bus interface protocol.

In Example 43, the subject matter of any one of Examples 42 and 44-46 can optionally include wherein the first bus interface protocol comprises a Peripheral Component Interconnect Express (PCIe) bus interface protocol, and wherein the second bus interface protocol comprises a Serial Advanced Technology Attachment (SATA) bus interface protocol.

In Example 44, the subject matter of any one of Examples 42-43 and 45-46 can optionally include wherein the at least one connector compatible with the second bus interface protocol and configured to mate with a storage device arranged to implement the second bus interface protocol includes a plurality of connectors.

In Example 45, the subject matter of any one of Examples 42-44 and 46 can optionally include wherein the at least one connector compatible with the first bus interface protocol and configured to mate with a storage device arranged to implement the first bus interface protocol includes a plurality of connectors.

In Example 46, the subject matter of any one of Examples 42-45 can optionally include wherein the second end includes first and second fingers, the at least one connector compatible with the second bus interface protocol and configured to mate with a storage device arranged to implement the second bus interface protocol including one connector coupled to the first finger, the at least one connector compatible with the first bus interface protocol and configured to mate with a storage device arranged to implement the first bus interface protocol including one connector coupled to the second finger.

Example 47 is a machine readable medium including code, when executed, to cause a machine to perform the method of any one of claims 1-10.

Example 48 is an apparatus for detecting a storage device during a system boot operation, comprising: means for detecting, during a system boot operation, whether a storage device implementing a first bus interface protocol is coupled to a system through a connector; means for programming a bus clock to the connector to be off in response to detecting that no storage device implementing the first bus interface protocol is coupled to the system through the connector; means for reprogramming a buffer, after programming the bus clock to be off, to assume that the connector implements a second bus interface protocol to couple a storage device; means for detecting whether a storage device implementing the second bus interface protocol is coupled to the connector, after reprogramming the buffer; and means for initializing the storage device implementing the second bus interface protocol in response to detecting that the storage device implementing the second bus interface protocol is coupled to the connector.

Example 49 is an apparatus comprising means to perform a method as claimed in any preceding Example.

What is claimed:

1. A method, comprising:
    detecting, during a system boot operation, whether a device implementing a first bus interface protocol is coupled to a bus in the system through a connector, wherein the detecting includes evaluating a group comprising a plurality of lanes of the bus;
    determining whether the device implementing the first bus interface protocol is a storage device implementing a logical device interface protocol in response to detecting that the device implementing the first bus interface protocol is coupled to the system through the connector;
    initializing the device as a storage device to communicate on the bus in response to determining that the device is a storage device implementing a logical device interface protocol;
    initializing the device implementing the first bus interface protocol to communicate on the bus in response to determining that the device is not a storage device implementing a logical device interface protocol;
    programming a bus clock to the connector to be off in response to detecting that no device implementing the first bus interface protocol is coupled to the bus in the system through the connector;
    after programming the bus clock to be off, reprogramming a buffer to connect to a device implementing a second bus interface protocol to couple a device;
    after reprogramming the buffer, detecting whether a device implementing the second bus interface protocol is coupled to the bus in the system through the connector; and
    initializing the device implementing the second bus interface protocol in response to detecting that the device implementing the second bus interface protocol is coupled to the bus in the system through the connector.

2. The method of claim 1, wherein the first bus interface protocol comprises a Peripheral Component Interconnect Express (PCIe) bus interface protocol, and the second bus interface protocol comprises a Serial Advanced Technology Attachment (SATA) bus interface protocol.

3. The method of claim 1, wherein the group comprising a plurality of lanes of the bus comprises a four lane high speed input output (HSIO) group.

4. The method of claim 3, wherein reprogramming the buffer includes reprogramming the buffer on four ports.

5. The method of claim 4, further comprising turning off any unused buffer after the initializing the device implementing the second bus interface protocol in response to detecting that the device implementing the second bus interface protocol is coupled to the bus in the system through the connector.

6. The method of claim 1, wherein the first bus interface protocol comprises a Peripheral Component Interconnect Express (PCIe) bus interface protocol, wherein the second bus interface protocol comprises a Serial Advanced Technology Attachment (SATA) bus interface protocol, and wherein the logical device interface protocol comprises a Non-Volatile Memory Express (NVMe) logical device bus interface protocol.

7. The method of claim 6, wherein the group comprising a plurality of lanes of the bus comprises a four lane high speed input output (HSIO) group.

8. The method of claim 7, further comprising, after initializing the storage device in response to determining that the device implementing the first bus interface protocol also implements a logical device interface protocol, reprogramming any unused HSIO buffers to assume that the connector implements the second bus interface protocol.

9. The method of claim 1, wherein the initializing the device implementing the second bus interface protocol in response to detecting that the device implementing the second bus interface protocol is coupled to the bus in the system through the connector comprises initializing a plurality of SATA drives.

10. An apparatus comprising:
initialization logic in communication with a bus, a bus clock, a buffer, a connector, and a storage device, at least a portion of the initialization logic in hardware, the initialization logic to:
detect whether a device arranged to implement a first bus interface protocol is coupled to the bus through the connector, wherein the detection includes evaluation of a group comprising a plurality of lanes of the bus;
determine whether the device arranged to implement the first bus interface protocol is a storage device arranged to implement a logical device interface protocol in response to detection of the device arranged to implement the first bus interface protocol is coupled to the bus through the connector;
initialize the device as a storage device to communicate on the bus in response to the determination that the device is a storage device implementing a logical device interface protocol;
initialize the device implementing the first bus interface protocol to communicate on the bus in response to a determination that the device is not a storage device implementing a logical device interface protocol;
program a bus clock to the connector to be off in response to detection of no device arranged to implement the first bus interface protocol is coupled through the connector;
after the bus clock is programmed to be off, reprogram a buffer to connect to a device that implements a second bus interface protocol to the bus to couple a device to the bus through the connector;
after the buffer is reprogrammed, detect whether a device arranged to implement the second bus interface protocol is coupled to the connector; and
initialize the device arranged to implement the second bus interface protocol in response to detection that a device arranged to implement the second bus interface protocol is coupled to the connector.

11. The apparatus of claim 10, wherein the first bus interface protocol comprises a Peripheral Component Interconnect Express (PCIe) bus interface protocol, and the second bus interface protocol comprises a Serial Advanced Technology Attachment (SATA) bus interface protocol.

12. The apparatus of claim 10, wherein group comprising a plurality of lanes of the bus comprises a four lane high speed input output (HSIO) group.

13. The apparatus of claim 10, wherein the first bus interface protocol comprises a Peripheral Component Interconnect Express (PCIe) bus interface protocol, wherein the second bus interface protocol comprises a Serial Advanced Technology Attachment (SATA) bus interface protocol, and wherein the logical device interface protocol comprises a Non-Volatile Memory Express (NVMe) logical device bus interface protocol.

14. The apparatus of claim 13, wherein the group comprising a plurality of lanes of the bus comprises a four lane high speed input output (HSIO) group.

15. The apparatus of claim 14, wherein the initialization logic, after the initialization of the storage device in response to the determination that the device arranged to implement the first bus interface protocol also implements a logical device interface protocol, reprograms any unused HSIO buffers to cause the connector to implement the second bus interface protocol.

16. The apparatus of claim 10, wherein the initialization logic that is configured to initialize the device arranged to implement the second bus interface protocol in response to detection that a device arranged to implement the second bus interface protocol is coupled to the connector, is configured to initialize a plurality of SATA drives.

17. A system comprising:
a bus;
a bus clock in communication with the bus;
a buffer in communication with the bus;
a storage device for storing data;
a connector configured to couple the storage device to the bus;
initialization logic to:
detect whether a device arranged to implement a first bus interface protocol is coupled to the bus through the connector, wherein the detection includes evaluation of a group comprising a plurality of lanes of the bus;
determine whether the device arranged to implement the first bus interface protocol is a storage device arranged to implement a logical device interface protocol in response to detection of the device arranged to implement the first bus interface protocol is coupled to the bus through the connector;
initialize the device as a storage device to communicate on the bus in response to the determination that the device is a storage device implementing a logical device interface protocol;
initialize a device implementing the first bus interface protocol to communicate on the bus in response to a determination that the device is not a storage device implementing a logical device interface protocol;
program a bus clock to the connector to be off in response to detection of no device arranged to implement the first bus interface protocol is coupled to the system through the connector;
after the bus clock is programmed to be off, reprogram a buffer to connect to a device that implements a second bus interface protocol to the bus to couple a device to the bus through the connector;
after the buffer is reprogrammed, detect whether a device implementing the second bus interface protocol is coupled to the connector; and
initialize the device arranged to implement the second bus interface protocol in response to detection that a device arranged to implement the second bus interface protocol is coupled to the connector.

18. The system of claim 17, wherein the first bus interface protocol comprises a Peripheral Component Interconnect Express (PCIe) bus interface protocol, and the second bus interface protocol comprises a Serial Advanced Technology Attachment (SATA) bus interface protocol.

19. The system of claim 17, wherein the group comprising a plurality of lanes of the bus comprises a four lane high speed input output (HSIO) group.

20. The system of claim 17, wherein the first bus interface protocol comprises a Peripheral Component Interconnect Express (PCIe) bus interface protocol, wherein the second bus interface protocol comprises a Serial Advanced Technology Attachment (SATA) bus interface protocol, and wherein the logical device interface protocol comprises a Non-Volatile Memory Express (NVMe) logical device interface protocol.

21. The system of claim 20, wherein the group comprising a plurality of lanes of the bus comprises a four lane high speed input output (HSIO) group.

22. The system of claim 21, wherein the initialization logic, after the initialization of the storage device in response to the determination that the device arranged to implement the first bus interface protocol also implements a logical device interface protocol, reprograms any unused HSIO buffers to cause the connector to implement the second bus interface protocol.

23. The system of claim 17, wherein the initialization logic that is configured to initialize the device arranged to implement the second bus interface protocol in response to detection that a device arranged to implement the second bus interface protocol is coupled to the connector, is configured to initialize a plurality of SATA drives.

* * * * *